United States Patent [19]

Bailey

[11] Patent Number: 4,494,798
[45] Date of Patent: Jan. 22, 1985

[54] SIDE-DUMPING, MATERIAL-HAULING CONVEYANCE

[76] Inventor: Clarence W. Bailey, 2005 Huston St., Marysville, Calif. 95901

[21] Appl. No.: 419,823

[22] Filed: Sep. 20, 1982

Related U.S. Application Data

[63] Continuation of Ser. No. 118,207, Feb. 4, 1980, abandoned.

[51] Int. Cl.³ .............................................. B60P 1/16
[52] U.S. Cl. .................................. 298/17.6; 105/271;
 298/10; 298/18; 298/22 P; 280/404; 280/426;
 296/184
[58] Field of Search .................. 298/1 R, 1 C, 1 S, 6,
 298/8 R, 8 H, 8 T, 10, 17 R, 17.5, 17.6, 17.7,
 17.8, 18, 19 R, 22 R, 22 AE, 20 A, 22 P;
 280/404, 426; 105/261 R, 263, 270, 271, 272,
 274; 296/184

[56] References Cited

U.S. PATENT DOCUMENTS

| | | |
|---|---|---|
| 2,023,700 | 12/1935 | Rodler . |
| 2,194,068 | 3/1940 | Eisenberg . |
| 2,513,658 | 7/1950 | MacDonald ............................ 298/5 |
| 2,794,655 | 6/1957 | Charette ............................. 280/426 |
| 2,848,275 | 8/1958 | Armington ......................... 298/17.6 |
| 3,101,974 | 8/1963 | Robertson et al. ................ 298/17.6 |
| 3,847,405 | 11/1974 | Pearce ............................ 280/426 X |
| 3,972,540 | 8/1976 | Donaldson ..................... 280/426 X |
| 4,242,031 | 12/1980 | McMullen ....................... 298/18 X |

FOREIGN PATENT DOCUMENTS

| | | |
|---|---|---|
| 48282 | 1/1911 | Austria ............................... 298/17.6 |
| 825641 | 11/1951 | Fed. Rep. of Germany ........ 298/18 |
| 149125 | 11/1979 | Japan .................................. 298/17.6 |
| 210225 | 1/1924 | United Kingdom ................ 280/426 |

Primary Examiner—Frank E. Werner
Attorney, Agent, or Firm—Flehr, Hohbach, Test, Albritton & Herbert

[57] ABSTRACT

A dual side-dumping truck and trailer combination utilizing a dolly-type trailer and a frameless material hauling bed. The bed is suspended on bunk assemblies mounted rotatably on bolsters on the truck frame and the trailer frame. Hinge mounting arrangements on the ends of the bunk assemblies enable selective tilting of the bed to one side or the other. The dolly-type trailer provides increased maneuverability and improved safety factor by enabling jackknifing while dumping.

7 Claims, 12 Drawing Figures

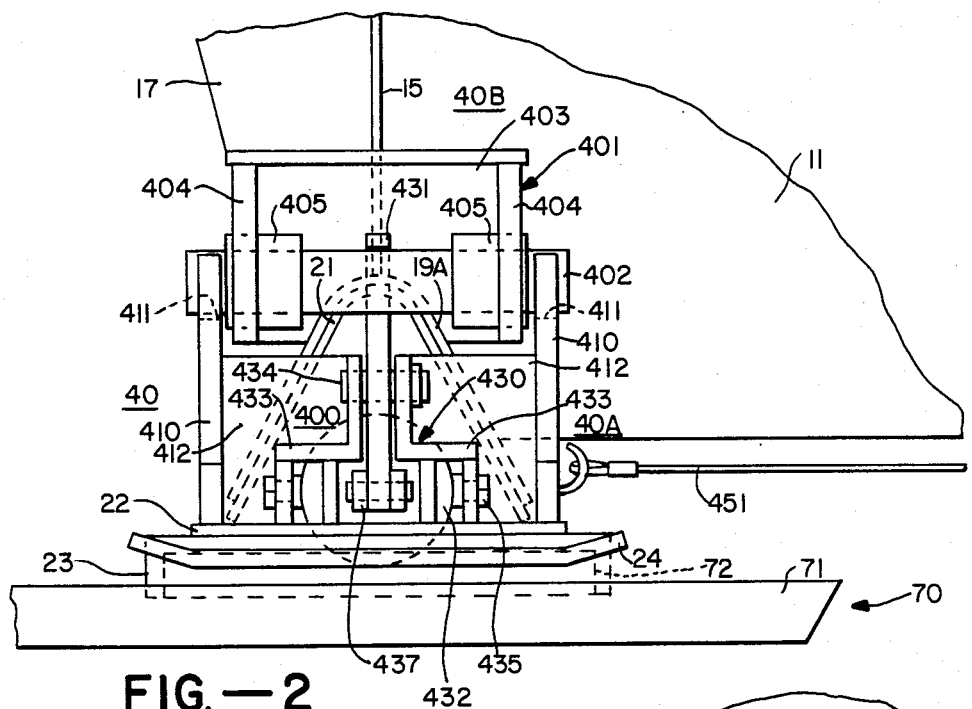
FIG.—2
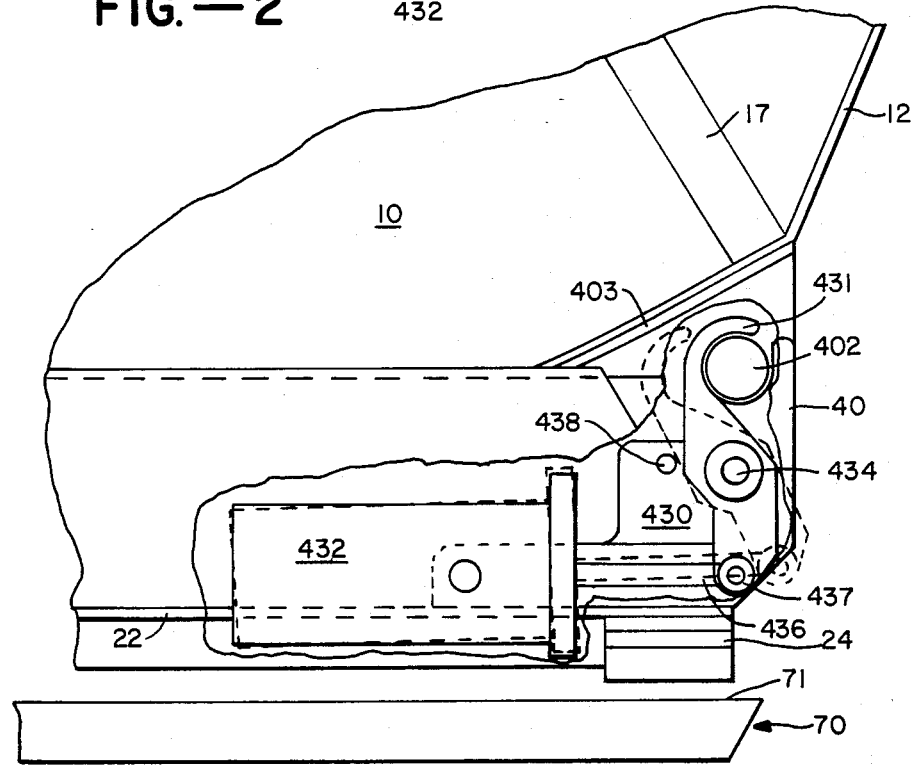
FIG.—3

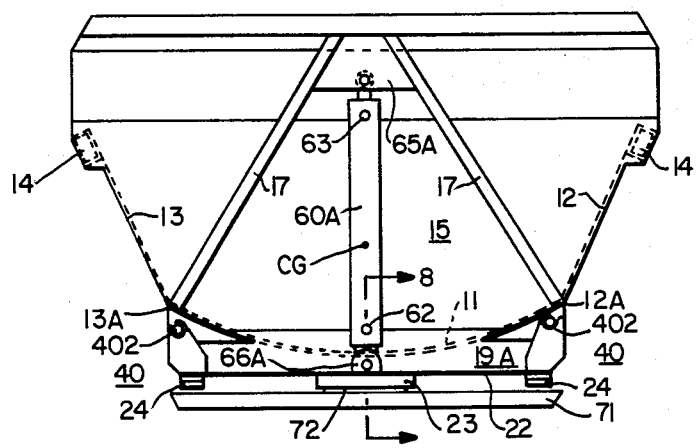
FIG.—4
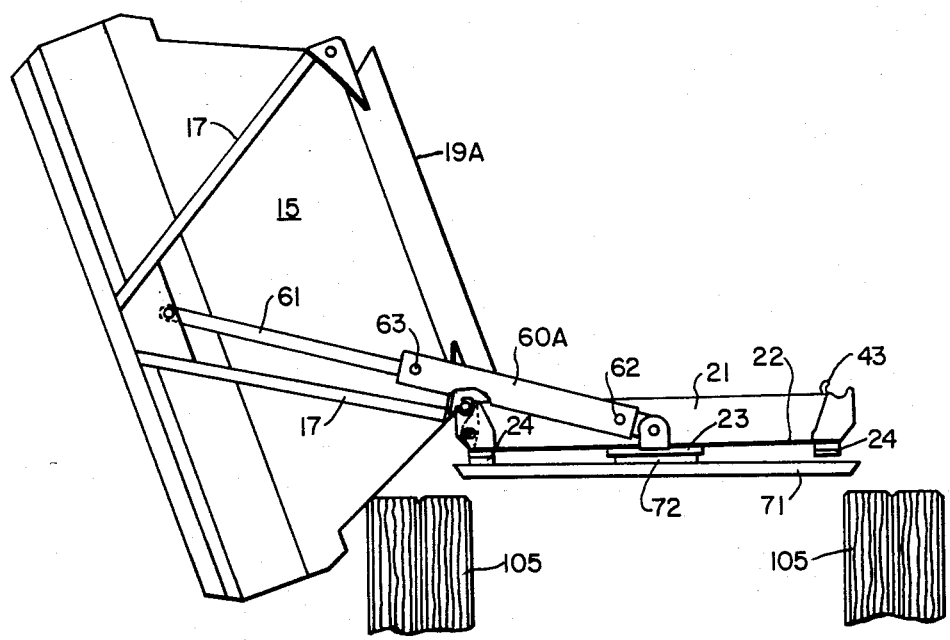
FIG.—5

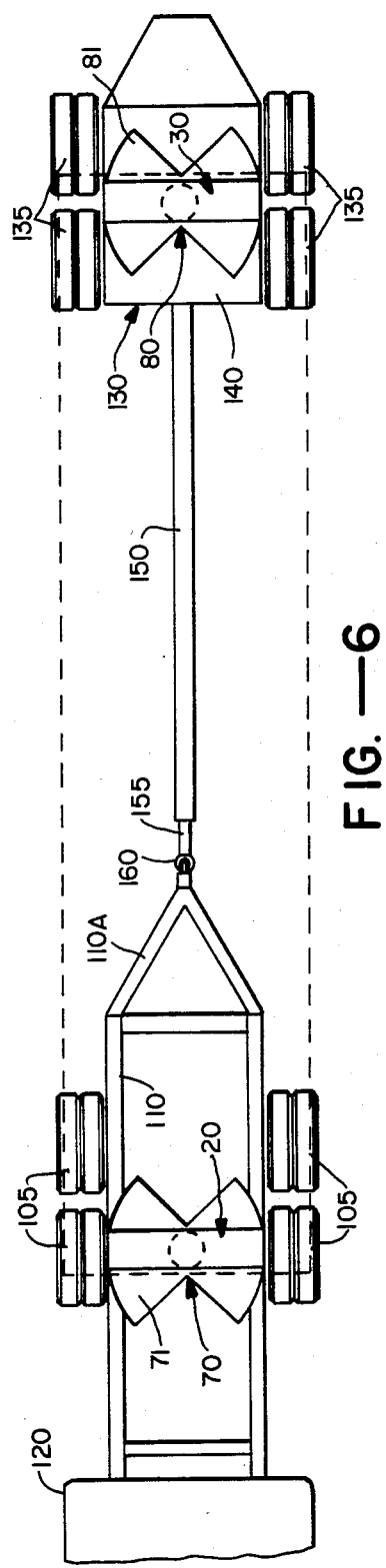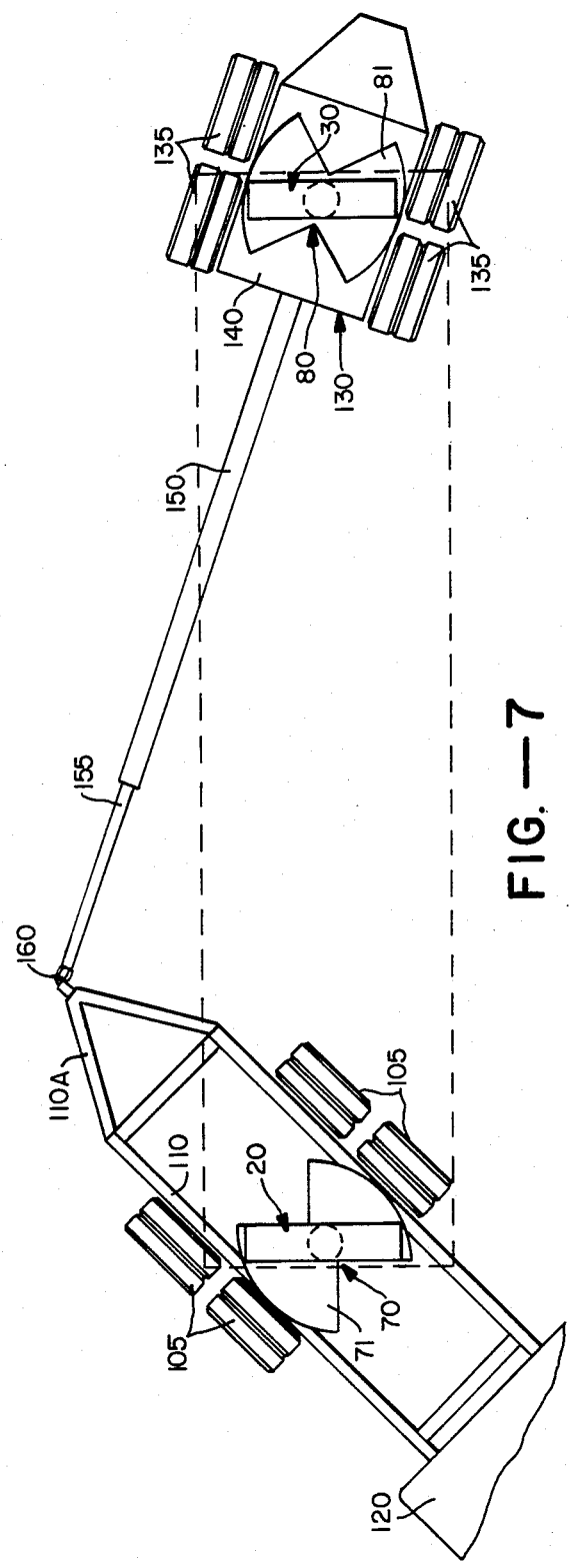
FIG.—6
FIG.—7

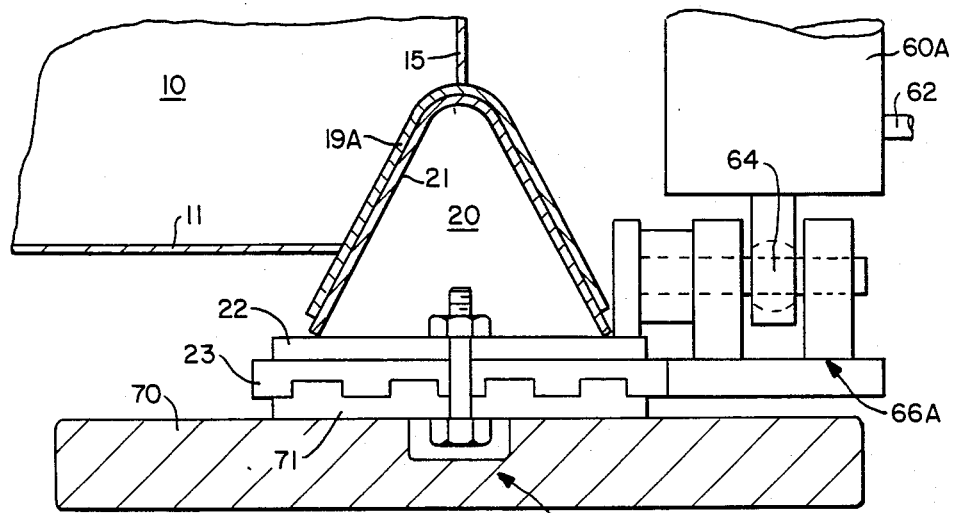
FIG.—8
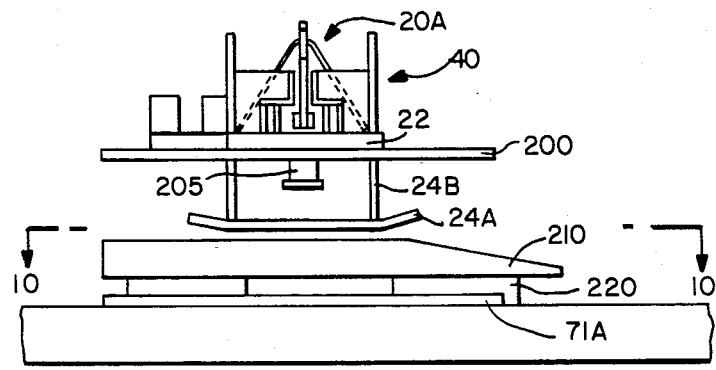
FIG.—9
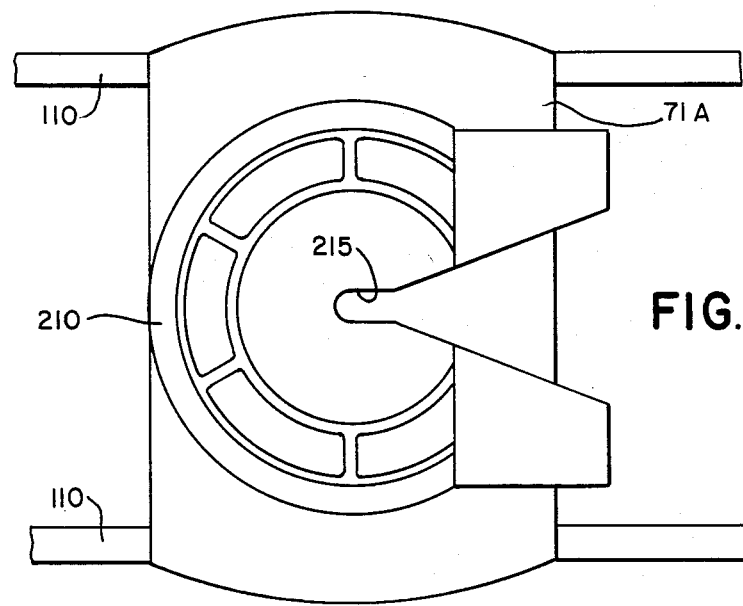
FIG.—10

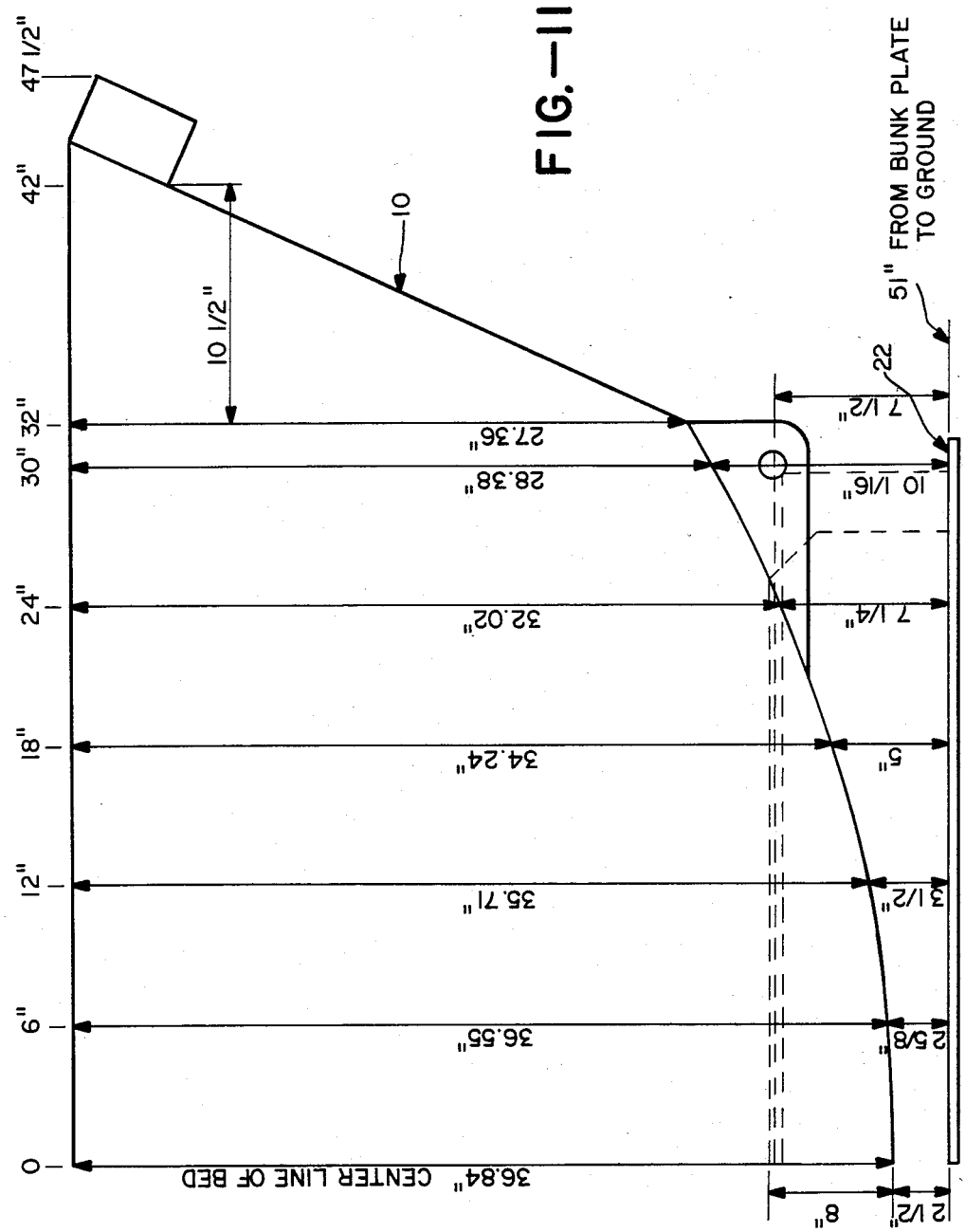

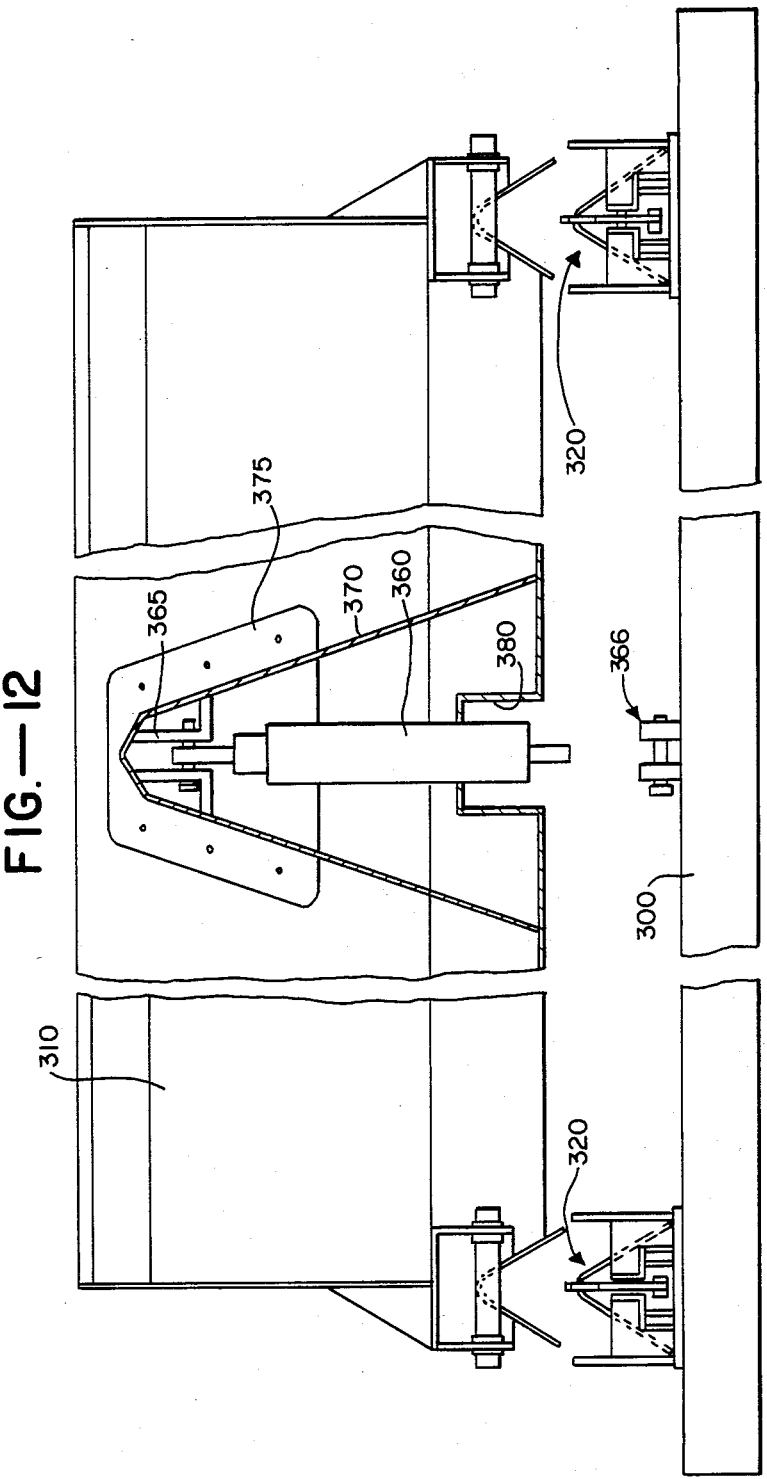
FIG.—12

SIDE-DUMPING, MATERIAL-HAULING CONVEYANCE

This is a continuation of U.S. patent application Ser. No. 118,207, filed Feb. 4, 1980, now abandoned.

This invention relates, in general, to material-hauling conveyances and, in particular, to material-hauling conveyances having a side-dumping capability.

The trucking industry standard for large payload hauling of heavy materials such as rock, rip rap, and aggregates of all sizes has been the frameless end dump trailer first introduced by Bailey Engineering and Manufacturing Company over ten years ago. A variation of the Bailey frameless end dump trailer is shown in U.S. Pat. No. 3,844,616. The frameless construction of this type of trailer greatly reduced the tare weight of the trailer, and thus enabled the hauling of a larger payload within the forty-ton legal limit on gross vehicle weight. Generally, these frameless trailers are about twenty-four feet long, eight feet wide overall, and have a payload capacity of about twenty-two and one-half tons.

While the frameless end dump trailer performs in a generally satisfactory manner for hauling heavy material useful in building roads, dams, levees and the like, it is sometimes disadvantageous to be required to dump the payload to the rear of the trailer when the material then has to be spread or relocated to another place such as the side of an earthen dam or levee or into a trench beside the roadway. Under such conditions, it would be preferable to have a hauling conveyance with a large payload capacity which is capable of dumping the load to the side of the vehicle.

Another somewhat frequently encountered disadvantage of the frameless end dump trailer is the inability of the trailer to be used in work on narrow curving road beds because the wheels on the trailer do not track the truck wheels. Thus, it is often necessary to dump the payload out of the truck and use a more maneuverable conveyance to cart the material to its ultimate destination. This often wastes material, adds substantial cost to the project, and delays the completion of the project.

The trucking industry has recognized to some extent the need for a side-dumping, material-hauling conveyance. Some of the equipment which has heretofore been designed carries the load between the rear truck tires and trailer tires to provide stability while dumping, i.e., to prevent overturning the tractor and trailer while dumping to the side. This approach is exemplified in Gustafson U.S. Pat. No. 2,693,531 and Armington U.S. Pat. No. 2,848,275. The trailers illustrated in these patents are capable of dumping selectively to either side, but are intended for offroad use only and for carrying small payloads over short distances.

Other side-dumping trailers have been designed with over-the-wheels bed positions, but they employ heavy chassis and bed construction, and use side doors on the bed to enable the bed to reach a sufficient angle to the horizontal to dump all the load without having the center of gravity of the loaded trailer go over and beyond the pivot point of the bed. This type of equipment is exemplified in Flowers U.S. Pat. Nos. 3,240,164 and 3,316,019. While this equipment is capable of selectively dumping the load to either side, the weight of the hauling bed and chassis reduces the gross payload capacity. Furthermore, the side door mechanisms add substantially to the complexity and cost of the equipment.

Trucco et al. U.S. Pat. No. 3,323,838 also discloses a side dump vehicle having the hauling beds mounted on a chassis over the wheels, but uses two separate beds simultaneously dumping to opposite sides to prevent overturning. Furthermore, the beds each have one shallow side in order to achieve a sufficient dumping angle without taking the center of gravity of the loaded bed over the pivot point. This bed profile, along with the construction of the bed and the weight of the chassis, limits the payload capacity of the vehicle. The requirement to dump simultaneously to both sides could be highly disadvantageous in some projects where the payload needs to be located only on one side of the vehicle, such as when a trench on one side of the vehicle is to be filled.

None of this prior art side-dumping equipment provides a trailer-truck arrangement having improved tracking ability, and none of the equipment is capable of achieving the payload capacity of the frameless end dump previously described, much less a larger payload capacity.

It is an object of this invention to provide an improved material-hauling conveyance with a dual side-dumping capability.

It is a further object of this invention to provide a material-hauling conveyance having both a larger payload capacity than the frameless end dump trailer and a dual side-dumping capability.

It is a further object of this invention to provide a material-hauling trailer having a side-dumping capability and improved tracking capability.

In accordance with one aspect of this invention, an improved material-hauling conveyance with dual side-dumping capability employs a frameless material-containing bed comprising a floor portion, a pair of side wall portions each meeting the respective edge of the floor portion at a break line and angling away from the floor portion to form a preselected angle to the vertical, and a pair of end wall portions. A conveyance means is provided for transporting the bed and includes a chassis adapted to be carried above at least a pair of rear wheels and a pair of front wheels. At least a pair of hinge-mounting means is located on opposite sides of the bed for normally retaining the bed on the chassis and for enabling the bed to be tilted selectively to one of the sides around a rotation axis. A hoisting means is mounted to the chassis and to the bed at the center line of the bed for raising the bed to tilt it on a selected one of the hinge-mounting means. The profile of the bed and the position of the rotation axis provided by the hinge-mounting means are constructed and arranged such that the bed, when loaded with material, may be tilted by the hoisting means until the center of gravity of the bed and the load passes over and beyond the rotation axis to a position such that one of the side wall portions of the bed is at an angle to the horizontal sufficient to completely dump the material from the bed without bumping into the wheels or turning over the conveyance means.

In a preferred embodiment of the invention, the conveyance means is a dolly-type trailer having a chassis comprising separate front and rear bunk assemblies adapted to be mounted in a horizontally rotatable fashion on the frame of a truck tractor and the bolster assembly on the frame of the trailer, respectively. The dolly-type trailer further includes a reach extending forward from the trailer frame and having a sliding pole compensator mounted therein which is adapted to be hitched to the rear of the frame of the truck tractor. In this embodiment, the bed has a pair of top hats, each mounted on the bottom one of the end wall portions thereof, and the front and rear bunk assemblies each have a bottom hat shaped to engage in mating fashion with one of the top hats. Furthermore, the hinge-mounting means is positioned on each end of each of the bunk assemblies, whereby the bed is suspended between the front and rear bunk assemblies on the top hats, and the trailer is pulled by the bed and steered by the reach and compensator assembly to provide a tracking-cornering action between the truck tractor wheels and the trailer wheels. This type of conveyance means further enables the truck tractor and trailer combination to be jackknifed to the side opposite the side to be dumped toward to increase the safety factor of dumping.

In accordance with another aspect of this invention, a material-hauling conveyance having a side-dumping capability and improved maneuverability is provided by utilizing a dolly-type trailer having a frame, at least a pair of wheels mounted on the frame, a bolster assembly mounted on the frame over the wheels, and a reach extending forward from the frame with a sliding pole compensator mounted therein and adapted to be hitched to the rear of the frame of the truck tractor. A pair of bunk assemblies are employed, and these bunk assemblies are adapted to be mounted in horizontally rotatable fashion on a bolster assembly on the trailer and on a bolster assembly provided on the frame of the truck tractor. A material container bed is provided, together with means for mounting the bed in a suspended fashion on the bunk assemblies. Hinge-mounting means are provided for normally retaining the bed on the bunk assemblies and for enabling the bed to be tilted to at least one side to dump the contents thereof. Hoisting means are mounted to each of the bunk assemblies and the bed for raising the bed to tilt it on the hinge-mounting means. Via this combination, the trailer is pulled by the bed and steered by the reach and compensator assembly to provide a tracking-cornering action of the truck and trailer and to enable the truck and trailer combination to be jackknifed to the side opposite the dumping side of the bed to increase the safety factor of dumping.

The dual side-dumping conveyance of this invention has a number of advantages over both the frameless rear end dump vehicle previously described and the prior art side-dumping conveyances discussed above. The special design of the profile of the bed enables the center of gravity of the loaded bed to be carried over the pivot point such that the load can be completely dumped without requiring side gates which add to the complexity and cost of the prior art equipment. Because of this side-dumping capability, the conveyance is capable of dumping to either side while stationary or while traveling slowly in order to distribute the load along the side of the truck. This is particularly advantageous when dumping into a trench and avoids the wasting of material either by dumping too much material in one location or dumping part of the material on the ground. It is especially advantageous when dumping into a trench where traffic would be blocked by a rear dump vehicle.

The use of a frameless bed mounted on the dolly-type trailer enables the attainment of both a larger, legal payload due to the increased wheel base made possible by the side-dumping capability and improved maneuverability of the trailer and truck combination due to the improved tracking. This enables the side-dumping conveyance of this invention to be utilized in areas which would be otherwise inaccessible to the end-dumping equipment. When utilized in a jackknifed dump position, the contents of the bed may be dumped to the side on level ground and thereafter the truck and trailer can back-up and then pull around the pile. This avoids driving the tires over the dumped material and thus precludes damaging the tires, getting the tires dirty or stuck in the material, or contaminating the material itself.

Other objects, features and advantages of this invention will be apparent from a consideration of the following detailed description taken in conjunction with the accompanying drawings.

FIG. 2 is a close-up side view of the bunk assembly and releasable hinge-mounting means for a side-dumping trailer in accordance with this invention.

FIG. 3 is a partly cut-away view of the releasable hinge-mounting means in accordance with this invention.

FIG. 4 is a rear view of the dual side-dumping trailer arrangement in accordance with this invention with the bed in its normal hauling position.

FIG. 5 is a rear view of the dual side-dumping trailer arrangement of this invention showing the bed in a dump position.

FIG. 6 is a view of the truck and trailer combination taken along the lines 6—6 in FIG. 1 showing the truck and trailer aligned with each other going down a straight road.

FIG. 7 shows the truck and trailer combination in a cornering or jackknifed position.

FIG. 8 is a partial cross-section view taken along the lines 8—8 in FIG. 4.

FIG. 9 is a side view of a alternate fifth wheel mounting arrangement useful in connection with the invention.

FIG. 10 is a top view of the fifth wheel mounting arrangement taken along the line 10—10 in FIG. 9.

FIG. 11 is a section view through the profile of the bed taken along the lines 11—11 in FIG. 1 showing the respective dimensions which determine an optimum bed profile and hinge pin location.

FIG. 12 illustrates an alternative chassis and hoist mounting arrangement.

Figure 1:
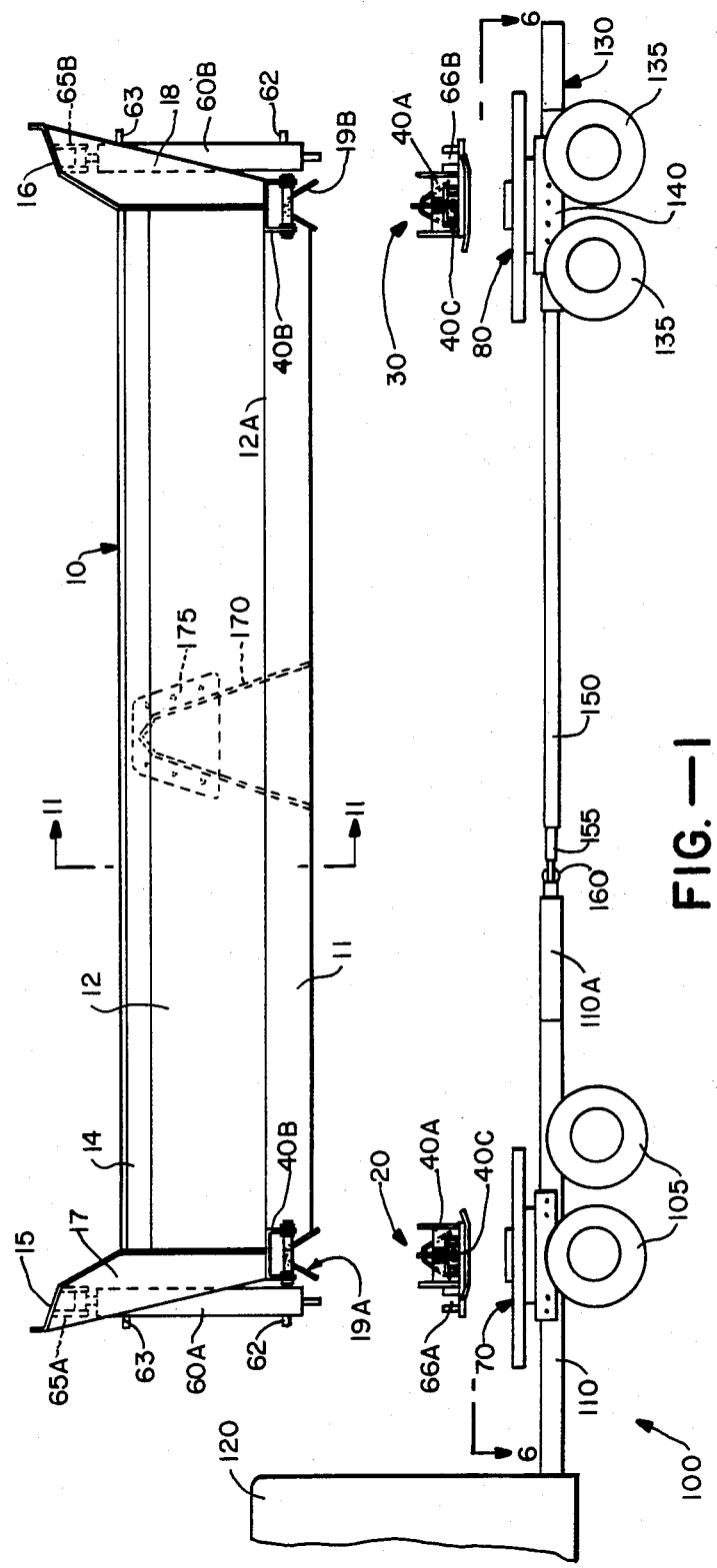
FIG. 1 is a partly exploded side view of the dual side-dumping tractor and trailer combination in accordance with this invention.

FIG. 1 is a partly exploded view of the major elements of a side-dumping, material-hauling conveyance in accordance with a preferred embodiment of this invention. As illustrated, the main components are a material-hauling bed 10, front and rear bunk assemblies 20 and 30, and truck and trailer bolster assemblies 70 and 80 which together form part of a chassis means on which the front and rear bunk assemblies 20 and 30 are mounted. The truck bolster assembly 70 is mounted on the frame 110 of a tractor truck 100 and extends over the truck wheels 105.

The trailer bolster assembly 80 is mounted on the frame 140 of a dolly-type trailer 130 and is mounted over the trailer wheels 135. As shown, a stinger section 110A on the truck frame 110 extends beyond the rear truck wheels. Reach 150 extends forward from trailer frame 140 toward the stinger 110A on the truck and contains a sliding pole compensator 155 which is hitched in a normal fashion via a hitch 160 to the rear of stinger 110A.

The major features of bed 10 can best be seen by considering the side view in FIG. 1 together with the end profile shown in dotted lines in FIG. 4. As illustrated, bed 10 consists essentially of a floor portion 11, a pair of side wall portions 12 and 13, a pair of top rails 14, a front headboard 15, and a rear headboard 16. As can best be seen in FIG. 4, the floor portion 11 of bed 10 comprises a section of an ellipse which meets the side wall portions 12 and 13 at the break lines 12A and 13A. The top rails 14 consist of box-like structures which are fastened in any suitable fashion, such as welding, to the tops of side wall portions 12 and 13. Front headboard 15 and rear headboard 16 form end wall portions of bed 10 and are mounted on the ends of the floor and side wall portions of bed 10 in an appropriate manner such as by welding. Preferably, the floor portion 11 and the two side wall portions 12 and 13 of bed 10 are formed of a continuous sheet of "T-1" steel or its equivalent, with the total length of the bed 10 being made up of separate sections of steel plates which are first formed to the bed profile and then welded together.

As can be seen, bed 10 is a frameless bed, that is, there are no supporting structural elements for the floor and side walls. The elliptical floor portion 11 together with the break lines 12A and 13A where the side wall portions 12 and 13 meet the elliptical floor provide a bed which has a high degree of strength, such that it will not buckle under loading, yet is able to twist and flex sufficiently to prevent cracking of the bed. The specific profile and dimensions of the bed 10 will be discussed later in connection with the side-dumping feature where it will be explained how the bed profile, together with other aspects of the design, enables the frameless bed to be completely dumped without overturning the truck and trailer combination.

As shown in FIGS. 1 and 4, front headboard braces 17 and rear headboard braces 18 are provided to brace the top of front headboard 15 and rear headboard 16, where the hoisting means 60A and 60B are rotatably mounted via hoist mounting bracket and pin assemblies 65A and 65B. Hoisting means 60A and 60B are rotatably mounted to bunk assemblies 20 and 30 via mounting bracket and pin assemblies 66A and 66B.

As shown in FIG. 1, a front top hat 19A is mounted on bed 10 at the bottom of front headboard 15 and a rear top hat 19B is mounted at the bottom of rear headboard 16. These two top hats 19A and 19B are utilized to suspend bed 10 between the front bunk assembly 20 and the rear bunk assembly 30. Referring momentarily to FIG. 8, it is seen how the top hats 19A and 19B rest on mating bottom hats which form part of the front and rear bunk assemblies 20 and 30. Since the front and rear bunk assemblies are identical, only one need be considered in connection with FIG. 8. As shown in FIG. 8, the front bunk assembly 20 consists essentially of a bottom hat 21 and a bunk plate 22 on which the bottom hat 21 is supported and fastened by any appropriate means such as welding. Top hat 19A is fastened (e.g., by welding) to the front headboard 15 of bed 10 and the floor portion 11 of bed 10. Both top hat 19A and bottom hat 21 have a generally inverted V shape with a rounded top portion. It can thus be seen that the mating top hat 19A and bottom hat 21A provide for the suspension of bed 10 between the bunk assemblies 20 and 30. FIG. 8 also shows the saucer and hub mounting arrangement whereby front bunk assembly 20 is mounted in a rotatable fashion on truck bolster assembly 70. An identical saucer and hub arrangement is provided for mounting rear bunk assembly 30 on trailer bolster assembly 80, as shown in FIG. 1. This mounting arrangement, as shown in FIG. 8, includes a hub 71 which is mounted on truck bolster assembly 70 and a saucer 23 which is mounted on the bottom of bunk plate 22. A bolt and nut arrangement 72 is provided to retain saucer 23 and hub 71 together. Saucer 23 and hub 71 have complementary circumferential grooves which enable the hub 71 to pull the saucer 23 and the bunk assembly affixed thereto while maintaining a rotatable mounting arrangement between bunk assembly 20 and bolster assembly 70. As will later be seen, this rotatable mounting arrangement is an important aspect of the overall preferred embodiment of this invention employing a dolly-type trailer such that tracking-type cornering action of the truck and trailer is achieved.

Referring back to FIG. 1 again, it can be seen that releasable hinge-mounting means comprises a hinge saddle assembly 40A, a hinge pin assembly 40B, and a latch assembly 40C, are provided on both ends of each of the front and rear bunk assemblies 20 and 30. These releasable hinge-mounting means enable the bed 10 to be selectively tilted to either side in order to dump its contents next to the truck and trailer combination. The releasable hinge-mounting means cooperate with the hoisting means 60A and 60B in order to accomplish this selective dual side-dumping capability.

The detailed structure of the releasable hinge-mounting means is depicted in FIG. 2. As shown in FIG. 2, hinge pin assembly 40B preferably consists of a hinge pin bracket 401 and a hinge pin 402. The hinge pin bracket 401 mounts the hinge pin 402 parallel to the floor portion 11 of bed 10. The axis of hinge pin 402 is substantially intersected by the plane of the side wall portion 11 of bed 10 and is otherwise located near the break line 11A. This places the axis of rotation at a point of strength and reduces the tendency to work the metal structure in this area which might ultimately produce cracks and structural failure.

In addition, it will be noted that the axis or center line of hinge pin 402 coincides precisely with the point where the upper portion of the bottom surface of top hat 19A mates with the top portion of the top surface of bottom hat 21. This location is important because as the bed 10 starts to rotate on hinge pin 402, it is desirable that the weight of bed 10 be rapidly transferred to the hinge saddle assembly rather than tending initially to rest on the edge of the top and bottom hat.

Hinge pin bracket 401 consists of a base member 403 which is mounted in appropriate fashion to the floor portion 11 of bed 10. This mounting can be accomplished by welding or other appropriate means. One half of the base 403 extends beyond the floor portion of the bed and the front headboard 15 and provides a bottom support for the headboard brace 17. A pair of arms 404 are mounted on base 403 and extend vertically downward. Arms 404 have bushings 405 mounted in apertures (not shown) formed in arms 404. Hinge pin 402 is actually received in the bushings 405 such that hinge bracket 401 rotates with respect to hinge pin 402 when the bed 10 is tilting around the hinge pin.

Hinge saddle assembly 40A essentially consists of a pair of saddle arms 410 which are fastened in appropriate fashion such as by welding to the top of bunk plate 22. Each of the hinge saddle arms 410 has a cradle portion 411 which receives the hinge pin 402. A pair of hinge saddle gussets 412 extend between the inner surfaces of the saddle arms 410 and the latch mounting bracket 430. These gussets are fastened to the hinge saddle arms 410 and the latch bracket 430 by an appropriate means, such as welding, and are also fastened by appropriate means, such as welding, to the end of bottom hat 21. In this manner, the hinge saddle arms are well supported on the bunk plate 22 and can readily withstand one-half of the weight of bed 10 and a load therein when the bed is rotating on hinge pin 402.

Latch assembly 40C consists essentially of a latch bracket 430, a latch hook 431, and an air-operated spring brake 432. More specifically, latch bracket 430 consists of two support arms 433 which are mounted in an appropriate fashion, such as welding on the top of bunk plate 22. Latch hook 431 is rotatably mounted on latch bracket 430 via latch pin 434. The air-operated spring brake 432 is rotatably mounted to latch bracket 430 via any suitable mounting arrangement designated 435 in FIG. 2. The arm 436 of spring brake 432 is fastened to the bottom of latch hook 431 via a mounting bracket 437 and is operative to move the latch hook 431 between a latched position shown in solid lines in FIG. 3 and an unlatched position shown in dotted lines in FIG. 3. A stop pin 438 is mounted behind the latch hook to limit the backward travel of the latch hook. As can be seen, the rotational mounting of spring brake 432 enables it to rotate slightly as it operates to rotate the latch hook 431. The latched position of latch hook 431 is such that the hook on the upper end thereof surrounds the hinge pin 402 and prevents bed 10 from raising vertically. On the other hand, when latch hook 431 is in the unlatched (dotted line) position shown in FIG. 3, the illustrated corner of bed 10 can raise up vertically. It is this selective latching feature which enables the bed 10 to be selectively tilted by the hoist means shown in FIG. 1 to one side or the other.

As shown in FIG. 2, a hook 450 is mounted on one side of saddle arm 410 in order to attach a loop on a cable 451 to the bunk assembly 20. The hinge saddle arm on the rear bunk assembly would have a similar hook to attach the other end of the cable 451. These cables may be utilized when the dual side-dumping trailer is dumping to the other side, while the truck and trailer are moving in a straight line so that the bunk assemblies will remain substantially in alignment and the top hats mounted on the bottom of the headboards of the bed will come down in a substantially mating fashion with the bottom hats on the bunk assemblies. If such a cable arrangement were not utilized to keep the bunk assemblies lined up, the jostling of the bunk assemblies while dumping might produce a substantial misalignment which might, in turn, cause one of the top hats to come down substantially misaligned with the corresponding bottom hat. This might damage either the top hat or the bottom hat since these two elements are capable of providing self-alignment only within a certain range of tolerance in the bunk positions.

Having described the releasable hinge mounting means which are provided on the four corners of the floor of bed 10 and the ends of the bunk assemblies 20 and 30, it will be readily apparent how the selective dual side-dumping capability is achieved with the apparatus of this invention. FIG. 4 shows bed 10 with the top hat 19A resting on the bottom hat in a normal load carrying position. This is the position that the bed would be in while the truck and trailer are going down the highway. At this time, all of the latches on the releasable hinge-mounting arrangements 40 are in a latched position such that the bed 10 is mechanically restrained from lifting off of the bunk assemblies 20 and 30. It will be noted that there is a slight amount of clearance between the bottom surface of the top rub plates 24 which are fastened to the underside of the bunk plate 22 and the top surface of the bottom rub plate 71 which is part of the bolster assembly. While going straight down the highway, the weight of the load is carried on the saucer 23 and the hub 72. However, when the truck and trailer combination is cornering and the bed and bunk assemblies lean to one side, one of the combinations of upper rub plates and lower rub plates will be in contact with each other and part of the weight of the load will be transferred to the bolster assembly through the rub plates.

Consider now the operation of the apparatus to dump the bed selectively to one side. To dump the bed to the left, as shown in FIG. 5, the latch hooks 431 in the hinge-mounting assemblies 40 on the right side of the bed would be shifted to the unlatched position by supplying air to the spring brake devices associated with these latch hooks. Once this has been accomplished, hydraulic fluid is supplied to the lower input port 62 of the double-acting hydraulic hoist 60A and to the corresponding lower port on the hydraulic hoist 60B on the other end of the bed. Since the weight of the load in the bed may be unevenly distributed between the front section and the rear section of the bed, it is necessary to utilize a flow divider (not shown) in the hydraulic lines (not shown) to the lower input ports 62 of the hoists 60A and 60B so that the amount of hydraulic fluid going to each hoist will be the same and both ends of the bed will be lifted the same distance regardless of the weight distribution. If this were not done, an uneven weight distribution in the bed could cause the bed to twist severely as one side is raised further than the other due to the differential pressure on the pistons of the two hoists.

As hydraulic fluid is supplied to the lower ports 62, the pistons 61 gradually push out. Initially, this tends to raise both sides of the bed 10. However, since the left-hand side is latched and the right-hand side is unlatched, the right side of the bed will go up and the left side of the bed will remain in the hinge-mounting means. As shown in FIGS. 2 and 4, the hinge pin 402 is not normally in contact with the bottom of the cradle portion of the hinge saddle arms. However, when the right-hand side of bed 10 is lifted up by the hoist, the pins associated with the left-hand hinge means drop into the cradle portion of the saddle arms, and at this point, the hinge bracket with the bushings attached thereto begins to rotate along with the bed on hinge pin 402. At this point as the bed gradually rotates around the left rotation axis, most of the weight of the bed comes to rest on the hinge saddle brackets and is transferred through the bunk plate 22 and the upper rub plate 24 to the bolster assembly 70.

As the hoist tilts the bed 10 further and further over the pivot axis on the left-hand side, the initial center of gravity of the bed and load (labeled CG) passes vertically over the pivot axis, and at some point, a portion of the load will begin to dump out of bed 10. To completely dump the load, the center of gravity CG which is approximately seventeen inches above the bottom of the bed at the start for a full load, passes beyond the pivot axis of the hinge-mounting means. Tilting of the bed around the axis of rotation of the hinge-mounting means continues until the left side portion 13 of the bed makes an angle of approximately forty-five degrees to the horizontal. At this angle, virtually all types of material will completely slide out of the bed and the contents of the bed may be completely dumped. At this point, however, the center of gravity of the partially dumped bed has passed well over the pivot axis of the hinge-mounting means. It will be appreciated that without careful design of the bed profile and optimized location of the pivoting axis of the bed on the hinge-mounting means, the tilting of the bed with the center of gravity of the bed and load passing well beyond the pivot point would be expected to overturn the truck and trailer together with the bed. It has been discovered, however, that by utilizing a low profile frameless bed of the type shown and by properly locating the pivot point of the bed, i.e., by properly locating the hinge-mounting means, the bed can be completely dumped with the dumping side wall portion of the bed achieving a forty-five degree dump angle without running into the tires on the truck or trailer, and without overturning with the truck and trailer on level ground.

Because the center of gravity of the bed after the load has been dumped is still past the pivot point of the hinge-mounting means, the hoist 60A must be a double-acting hoist in order to be able to pull bed 10 back to its normal hauling position. To do this, hydraulic fluid is pumped into the upper port 63 on the hoists and forced out of the lower port 62 such that the piston 61 is forced back into the hoist and the bed 10 rotates back toward the normal hauling position shown in FIG. 4. The inverted V-shaped design of the top hat and bottom hat provides a self-aligning feature for the bed on the bunk assembly. Thus, under normal conditions, the top hat 19A will come down to rest in an aligned position on bottom hat 21. Under certain circumstances, the alignment may not be sufficient for the hinge pin on the nondumping side of the bed to come to rest in the hinge saddle. When this occurs, the trailer brakes may be utilized to jostle the bed back and forth slightly to seat the hinge pin in the saddle. After the hinge pin is completely seated in the saddle, the operator can remove the air to the air-operated spring brakes on the right-hand side of the front and rear bunk assemblies, and the latch hooks will again engage the hinge pin and retain the bed securely on the bunk assemblies. To dump the bed 10 in the other direction the sequence would be just the opposite of that given above.

FIGS. 6 and 7 show the tracking-cornering action of the dual side-dumping conveyance of this invention when a dolly-type trailer is utilized. FIG. 6 shows the truck and trailer combination going in a straight line such that the truck wheels 105 and the trailer wheels 135 are lined up and the reach 150 extending forward from the trailer frame 140 is substantially lined up with the center line of the truck 100. FIG. 6 shows the stinger 110A on the rear of the truck as an A-frame structure, which is preferable to minimize the overall road width occupied by the truck and trailer combination when cornering. The stinger 110A may be mounted to the frame 110 of the truck in a removable fashion if it is desired that the truck be available to be used for other hauling purposes.

FIG. 7 shows the truck and trailer combination when the truck 100 is either cornering or backing in a jack-knifing position to maneuver the trailer. As can be seen in FIG. 7, the bed 10 which is shown in dotted outline may remain in a horizontal position while both the truck 100 and the trailer 130 are at a substantial angle. This is achieved by having the rotatable bunk assemblies mounted on the bolster assemblies of the truck and trailer. As the truck 100 turns, either for cornering or a backing type maneuver, the distance between the center pins of the saucer and hub arrangements on the bunk assemblies and bolster assemblies of the truck and trailer, respectively, remains the same. However, the stinger 110A of the truck pulls the reach 150 and sliding pole compensator 155 around to a location such that the truck frame and the reach and compensator make a triangle with the center line of the bed so that the wheels 135 on the dolly-type trailer 130 will tend to track the wheels 105 of the truck as the truck and trailer combination are cornering. Since the total length of the two sides of the triangle is greater than the hypotenuse which is the bed length, the sliding pole compensator 155 is pulled out of reach 150 as the truck 100 goes around a corner. It will thus be seen that it is actually the bed, suspended on the front and rear bunk assemblies which is pulling the trailer and the stinger 110A and the reach 150 with the sliding pole compensator 155 are merely steering the trailer 130 in a tracking fashion. The extent to which the trailer wheels follow in precisely the same track as the truck wheels can be adjusted by the relative distance between the front of the bed and the end of the stinger and the distance between the rear of the bed and the end of the reach. Generally, for purposes of stability, it is preferable for the trailer wheels not to track exactly but to track slightly inside the truck wheels. Because of the tracking-cornering action between the truck and the trailer, the overall conveyance utilizing the dolly-type trailer is considerably more maneuverable than a similar length truck and trailer combination utilizing a fixed set of trailer wheels and having only a pivot point on the bolster of the truck as in the normal kind of fifth wheel arrangement. This additional maneuverability can be highly significant in terms of permitting a longer bed and thus achieving a higher payload without sacrificing maneuverability and actually achieving a greater maneuverability of the overall conveyance at the higher payload.

FIGS. 9 and 10 depict some of the details of an alternate fifth wheel type mounting arrangement for the rotational mounting of the front bunk assembly. Basically, the mounting arrangement shown is the standard fifth wheel type mounting arrangement involving an upper fifth wheel plate 200 and a lower fifth wheel plate 210. For purposes of use with this invention, the lower fifth wheel plate 210 is blocked with a blocking means 220 in order to retain it in a horizontal position on the truck frame 110. The bunk assembly 20A and the portion of the releasable hinge mounting means 40 provided thereon are mounted to the upper fifth wheel plate 200. The center line of the front bunk assembly 20 coincides with the center line of the kingpin 205. As is well known, the kingpin 205 is adapted to be received in a latching aperture mechanism 215 on the lower fifth wheel so that the kingpin and upper fifth wheel plate can rotate with respect to the lower fifth wheel plate 210. The bunk assembly 20A has a slightly different skid plate arrangement with the skid plates 24A being mounted on extending legs 24B. This arrangement is necessary since the top of the lower fifth wheel plate is typically higher off of the truck frame than the bolster assembly on the arrangement depicted in FIG. 1 and FIG. 8. Accordingly, the upper skid plate 24A must be extended substantially below the bunk plate 22 in order to be in a proper position with respect to the lower skid plate 71A.

For the fifth wheel mounting arrangement, the lower skid plate 71A preferably comprises the configuration shown in FIG. 10. The skid plates 71 shown on the bolster assemblies 70 and 80, respectively, in FIG. 6 and the skid plate configuration 71A shown in FIG. 10 are designed such that the upper and lower skid plates will have a substantially complete mating surface regardless of the angle of the respective bolster assemblies on the truck and trailer with respect to the bunk assemblies. As discussed in connection with FIG. 4, the weight of the bed is transferred via the skid plates to the bolster assembly or the truck frame while dumping to a particular side. Since the truck may be jackknifed while dumping, it is important that the upper skid plate rest completely on the lower skid plate to avoid loading just a portion of the upper skid plate.

FIG. 11 is a dimensioned drawing of the contour of the bed 10, showing the actual location of the hinge pin and the dimensions with respect to the top and bottom hat and the distance from the bunk plate 22 to the ground. As can be seen, the overall height of the top of the bed above the ground is approximately ninety-six inches. The depth of the bed at the center line is slightly over three feet and the total width of the bed at the top is slightly under eight feet.

This bed profile or contour together with the hinge mounting arrangement was designed to meet the following requirements:
1. A bed capacity of twenty cubic yards minimum.
2. A legal highway/bridge gross weight of forty tons maximum.
3. A legal highway width of eight feet maximum.
4. A dump angle of the bed side of forty-five degrees minimum.
5. Dumping to either side with a center hoist.
6. A bed height of ninety-six inches maximum to accommodate most front loader devices.
7. A maximum safety factor of two against overturn of the truck and trailer under worst case conditions of attempting to dump a full bed of hardened concrete which will not leave the bed.

In order to minimize the tare weight of the bed, a frameless type cross section was selected for the bed. A curved elliptical floor section with an angle break of approximately sixty-six degrees between the floor section and the flat sides was selected to provide good structural strength for both lateral loading and longitudinal twisting. The bed length was essentially dictated by highway weight and bridge laws, which in California, for example, require thirty-six feet between outer axle groups. Taking into account the trunion-to-axle dimensions, a minimum bed length of thirty-three feet was established.

Having established a general bed profile for optimum loading strength, the optimum location of the axis of the hinge pin must be determined. To achieve such an optimum location, several factors must be taken into account:
1. As the hinge pin axis position is moved towards the center line of the vehicle, the bed must be raised higher above the wheels in order to be able to achieve the forty-five degee dump angle without interfering with the tires. This greatly increases the overturn torque on the truck and trailer while dumping a load and will reduce or eliminate the safety factor in dumping.
2. As the hinge pin position is moved outward from the center line of the vehicle, the pin can be in a lower position, but if the hinge axis is positioned too far out from the center line, the overturn torque again increases to an unsafe amount. In addition, the ninety-six inch legal width limit is a limiting factor on the movement of the hinge pin axis outwardly.
3. Another factor is the angle of the flat upper side of the bed. As the side angle approaches the vertical, the bed center of gravity must rotate further beyond the hinge pin axis to achieve the required dump angle for the side. Conversely, as the flat side angle becomes more horizontal, the capacity of the bed is severely reduced due to the ninety-six inch legal width constraint.
4. The best structural design from a strength standpoint is achieved by locating the dump pin center line very close to the break line between the elliptical floor section and the flat side section of the bed.

Taking all of these factors into consideration, the optimum bed profile and optimum hinge pin location can be determined by a careful trial and error approach utilizing calculations and scale modeling of the bed profile and pin location. It should, of course, be apparent that the difficulty of providing a sufficient safety factor in side dumping is reduced as the weight of the truck and trailer increases with respect to the weight of the bed and load. Utilizing the principles of this invention, it has been discovered that it is possible to design a high payload side-dumping vehicle which is capable of completely dumping the load by taking the center of gravity of the worst possible load over the pivoting axis of the hinge-mounting means without overturning the tractor and trailer. In the specific case of the preferred embodiment of this invention, the bed is designed to carry a payload of twenty-five tons with a weight of the empty bed itself being about three tons. This leaves twelve tons for the weight of the truck and trailer itself. As can be seen, the total weight of the bed and load is two-and-one-half times that of the truck and trailer. In spite of this, it has been possible to design a bed profile and hinge pin axis location which enables complete dumping of the bed with a safety factor of two under the worst load conditions. It should also be understood that the use of the dolly-type trailer with reach and sliding pole compensator arrangement enables the truck and trailer to be jackknifed to the side opposite the dumping side in order to further increase the safety factor in dumping a load from the bed. This is particularly useful where the material in the bed is to be dumped on ground which is not level and slopes down on the side of the truck and trailer on which the load is to be dumped. Consequently, the dolly-type trailer and truck combination enables the safe dumping of a load under virtually all conditions.

While the basic principles of this invention have been discussed above in connection with a dual side-dumping bed and mounting arrangement and a dolly-type trailer and truck combination, it should be understood that various alternative utilizations of the principles of this invention are possible. For example, as shown in FIG. 12, the bed 310 could be mounted on a flat bed truck chassis 300 instead of on a dolly-type trailer and truck combination. The chassis 300 could be either a flat bed truck chassis, a flat bed trailer chassis or a railroad car chassis. While the dual hoist arrangement shown in FIG. 1 could be utilized on a flat bed chassis, it would be preferable, as shown in FIG. 12, to utilize a single telescoping hoist 360 mounted between the chassis 300 and the bed 310 within the center baffle 370 of the bed. This can be accomplished by way of a lower hoist mounting bracket 366 which rotatably mounts the hoist to the chassis and a upper hoist bracket 365 which rotatably mounts the piston of the hoist to the bed 310. A stress plate 375 may be utilized on each of the two side portions of bed 310 in order to aid in distributing the stress of the loaded bed along the side walls thereof. The hoist 360 would extend through an appropriately sized slot 380 cut into the floor of the bed at the center portion thereof in order to enable the hoist to pivot freely to the required position during dumping. In all other respects, the bunk assemblies and the releasable hinge mounting means could be identical to those shown in FIGS. 1 through 3.

It should also be understood that, in the flat bed mounting arrangement shown in FIG. 12, it would further be possible to utilize a hoist which is positioned within a well in the chassis of the flat bed trailer or railroad car and has the piston attached to the bottom of the material-hauling bed.

It should also be apparent that the combination of the dolly-type trailer and truck arrangement could be utilized with any type of side dumping bed and hinge mounting arrangement, including any type of single or dual side-dumping arrangement and any type of bed design. It should also be understood that a variety of releasable hinge-mounting means could be employed and the particular means shown in FIGS. 2 and 3 is only one preferred way of providing a releasable hinge-mounting means for the dual side-dumping feature of the invention. An alternative would be to use, for example, a normal door-type hinge arrangement with a hinge pin which could be removed from the hinge means on one side to dump to the other side. Removal of the pin would be either manual or automatic.

It should also be understood that various configurations could be utilized for the top and bottom hat arrangement. For example, the top and bottom hats could both be essentially semicircular in profile or could have a parabolic or hyperbolic shape.

It will thus be seen that this invention is not limted to the embodiments disclosed, in that numerous modifications could be made without departing from the spirit and scope of the invention as claimed in the following claims.

What is claimed is:

1. In a material-hauling conveyance having a dual side-dumping capability,
    a frameless material containing bed comprising a floor portion, a pair of continuous side wall portions with no gates therein, each meeting the respective edge of said floor portion at a break line and angling away from said floor portion to form a preselected angle to the vertical, and front and rear end wall portions;
    conveyance means for transporting said bed, including a truck tractor and a dolly type trailer; said truck tractor including at least a pair of wheels and a truck frame mounted to said wheels and including a rearwardly extending stinger section; said dolly type trailer including at least a pair of wheels and further comprising a trailer frame mounted to said wheels and a reach and compensator assembly including a reach extending forward from said trailer frame and including a sliding pole compensator mounted therein with a front end of said compensator pivotally mounted to said stinger section of said truck frame;
    a chassis assembly comprising a front bunk assembly, means mounting said front bunk assembly in a horizontally rotatable manner on said truck frame, a bolster assembly mounted on said trailer frame, a rear bunk assembly, and means mounting said rear bunk assembly is a horizontally rotatable manner on said bolster assembly; said bed having a pair of top hats, each mounted on the bottom of one of said end wall portions thereof; and said front and rear bunk assemblies each having a bottom hat shaped to engage in mating fashion with one of said top hats to mount said bed on said chassis assembly in a suspended manner;
    a pair of hinge-mounting means located on opposite sides of said bed at the ends of each of said front and rear bunk assemblies for normally retaining said bed on said chassis assembly and selectably releasable for enabling said bed to be tilted selectively to one of said sides around a rotation axis; and
    hoisting means mounted to said chassis assembly and said bed at the center line of said bed for raising said bed to tilt it on a selected one of said hinge-mounting means;
    each of said hinge-mounting means being located with its rotation axis at a preselected location near an associated one of said break lines, and the width of said floor portion of said bed, the angle of said side wall portions of said bed, and the height of said rotation axis above the top of said wheels being together preselected in accordance with the overall width and depth of said bed, the anticipated center of gravity of said bed when loaded with material, and the weight of said conveyance means to enable said bed to be tilted by said hoisting means until said center of gravity passes over and beyond said rotation axis to a position such that one of said side wall portions is at an angle to the horizontal sufficient to completely dump said material from said bed without bumping into said wheels or turning over said conveyance means.

2. Apparatus as claimed in claim 1, wherein said means for mounting said front bunk assembly includes a bolster assembly mounted to said frame of said truck tractor, a cylindrical hub carried on said bolster assembly, and a saucer fastened in a central position on the underside of said front bunk assembly and mounted over said hub; said means for mounting said rear bunk assembly includes a hub fastened to said bolster assembly on said trailer frame and a saucer fastened in a central position on the underside of said rear bunk assembly and mounted over said hub.

3. Apparatus as claimed in claim 2, wherein said hoisting means comprises a double-acting hoist mounted on each end of said bed with the bottom end of each cylinder of said hoists mounted in a rotatable fashion in a bracket fastened to said saucer and the upper end of said piston mounted in a rotatable fashion to a bracket fastened on an associated end wall of said bed.

4. Apparatus as claimed in claim 1, wherein said means mounting said front bunk assembly comprises a truck-trailer fifth wheel mounting arrangement including a kingpin and upper fifth wheel plate mounted to the underside of said front bunk assembly and a blocked-up lower fifth wheel fastened on said frame of said tractor; and said rear bunk assembly includes a hub fastened to said bolster assembly on said trailer frame and a saucer fastened in a central position on the underside of said rear bunk assembly and mounted over said hub.

5. Apparatus as claimed in claim 1, wherein said top hat and said bottom hat each have an inverted V-shaped profile having complementary mating top and bottom surfaces, with a generally rounded top portion on each, said bottom hat being mounted on a bunk plate extending beyond the ends of said bottom hat; each of said hinge-mounting means comprising a hinge pin assembly mounted on said corner of said bottom portion of said bed, and a hinge saddle and a hinge latch assembly each mounted on said bunk plate adjacent said ends of said bottom hat, said hinge pin assembly including a hinge pin and a pin support bracket fastened to said bottom portion of said bed for mounting said hinge pin parallel thereto and at a slight distance therefrom to define an axis of rotation generally intersected by the plane of an associated side portion of said bed, said hinge saddle including at least a pair of saddle brackets fastened on said bunk plate and adapted to cradle said pin, and said latch including a latch bracket mounted on said bunk plate, a latch hook rotatably mounted on said latch bracket to provide an engaged latch hook position for retaining said pin in said saddle brackets, and a disengaged latch hook position in which said pin may be raised out of said saddle brackets, and means for selectively moving said latch hook between said engaged and disengaged positions.

6. Apparatus as claimed in claim 5, wherein said hinge pin assembly further includes a pair of bushings mounted on said pin support bracket and adapted to receive said pin such that said support bracket and bushings rotate with respect to said pin when said bed is being tilted around the axis defined by said pin; said pin support bracket and bushings support said hinge pin at a horizontal position with its center line substantially coincident with the common apex of the bottom surface of said top hat and the top surface of said bottom hat and said pin has a diameter such that its bottom surface is spaced from the mating surface of said saddle brackets when said top hats are resting on said bottom hats; and said means for selectively moving said latch hook comprises an air-operated spring brake mounted in a rotatable fashion to a portion of said latch bracket extending underneath said bottom hat and connected to said latch hook for automatically moving said latch hook between said engaged and disengaged positions thereof.

7. Apparatus as claimed in any of claims 1-6, wherein said floor and side wall portions of said bed are shaped to a preselected profile, said floor portion being shaped to have a profile consisting of a section of an ellipse and said side wall portions being substantially straight and extending away from a said break line where they intersect the respective ends of said elliptical section; said bed having an overall width of about eight feet and an overall depth of about three feet and an overall length of about thirty-three feet, with said floor portion extending about two-thirds the overall width of said bed; and a baffle is mounted about half way between said end wall portions of said bed and has a profile substantially corresponding to the profile of said bed, said baffle being fastened to said side portions and said bottom portion of said bed to relieve tensile stresses on the central portions of the bottom floor of said bed and to distribute said stresses to the side walls thereof while precluding said side walls from pulling in when said bed is loaded with material.

* * * * *